US012669754B2

(12) United States Patent
Roy et al.

(10) Patent No.: US 12,669,754 B2
(45) Date of Patent: Jun. 30, 2026

(54) METHOD FOR IMPROVING ACCURACY OF IMPRINT FORCE APPLICATION IN IMPRINT LITHOGRAPHY

(71) Applicant: CANON KABUSHIKI KAISHA, Tokyo (JP)

(72) Inventors: Nilabh K. Roy, Austin, TX (US); Jeffrey Dean Klein, Austin, TX (US)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 17/508,781

(22) Filed: Oct. 22, 2021

(65) Prior Publication Data

US 2023/0129132 A1 Apr. 27, 2023

(51) Int. Cl.
| | |
|---|---|
| *G06F 30/20* | (2020.01) |
| *G03F 7/00* | (2006.01) |
| *G06F 111/10* | (2020.01) |
| *G06F 119/18* | (2020.01) |

(52) U.S. Cl.
CPC .............. *G03F 7/705* (2013.01); *G06F 30/20* (2020.01); *G06F 2111/10* (2020.01); *G06F 2119/18* (2020.01)

(58) Field of Classification Search
CPC ...... G03F 7/705; G06F 30/20; G06F 2119/18; G06F 2111/10
See application file for complete search history.

(56) References Cited

U.S. PATENT DOCUMENTS

| | | | |
|---|---|---|---|
| 7,710,540 B2 | 5/2010 | Loopstra | |
| 8,825,182 B2 | 9/2014 | Simons | |
| 8,945,444 B2 | 2/2015 | Lu | |
| 9,090,014 B2 | 7/2015 | Lu | |
| 11,776,833 B2 * | 10/2023 | Roy | H01L 21/68 425/385 |
| 11,994,797 B2 * | 5/2024 | Roy | G05B 19/4099 |
| 12,366,800 B2 * | 7/2025 | Roy | G03F 7/0002 |

(Continued)

OTHER PUBLICATIONS

Akcalt, Elif, Kazunori Nemoto, and Reha Uzsoy. "Cycle-time improvements for photolithography process in semiconductor manufacturing." IEEE Transactions on Semiconductor Manufacturing 14.1 (2001): 48-56. § II (Year: 2001).*

(Continued)

*Primary Examiner* — David A Hopkins

(74) *Attorney, Agent, or Firm* — Canon U.S.A., Inc, IP Division

(57) ABSTRACT

A method for identifying a model for modeling cable stress relaxation dynamics of an imprint head is provided. The method includes performing a non-contact imprint test run for a predetermined number of wafers. Data from a force trace and a position trace of the imprint head during the non-contact imprint test run are collected to compute cable stress relaxation forces. A model having a plurality of different model orders is generated. A set of parameters of the model for each model order is identified. Residual sum of squares for wafer average error for each of the model orders is calculated based on the obtained cable stress relaxation forces. The set of parameters of one of the plurality of model orders may be based on a difference in the residual sum of squares for wafer average error between the one of the plurality of model orders and a next higher model.

6 Claims, 9 Drawing Sheets

(56) References Cited

U.S. PATENT DOCUMENTS

| | | | | |
|---|---|---|---|---|
| 2007/0067057 | A1* | 3/2007 | De Vos | G03F 7/70725 |
| | | | | 700/117 |
| 2010/0289190 | A1* | 11/2010 | Kawakami | B82Y 40/00 |
| | | | | 264/496 |
| 2010/0294147 | A1* | 11/2010 | Loiret-Bernal | B41F 19/068 |
| | | | | 101/41 |
| 2011/0187014 | A1* | 8/2011 | Taylor | B29C 59/02 |
| | | | | 264/40.5 |
| 2013/0015598 | A1 | 1/2013 | Kimura | |

OTHER PUBLICATIONS

Carriço, Nuno Ricardo. Calibration of high-precision flexure parallel robots. No. 3712. EPFL, 2007. § 2.4, in particular §§ 2.4.2 and 2.4.5 (Year: 2007).*

Hu, Chuxiong, and Yu Zhu. "Self-calibration of two-dimensional precision metrology systems." New Trends and Developments in Metrology (2016): 185-210. Abstract, then see § 1 ¶¶ 1-2 (Year: 2016).*

Kuniyoshi, Shinji, et al. "Stepper stability improvement by a perfect self-calibration system." Optical/Laser Microlithography VII. vol. 2197. SPIE, 1994. Abstract and § 1 (Year: 1994).*

Nicola. "Virtual metrology for semiconductor manufacturing applications." University of Padua. Jun. 28, 2010 (Year: 2010).*

Roy, Nilabh, et al. "Overlay models for nanoimprint lithography." Novel Patterning Technologies 2021. vol. 11610. SPIE, 2021. (Year: 2021).*

SEMI International Standards: Compilation of Terms, 2018, URL: www(dot)semi(dot)org/sites/semi(dot)org/files/2020-02/ CompilationTerms1218_0(dot)pdf—see p. 106 for the definition of "dry run (mechanical dry run)" (Year: 2018).*

Ye, Jun. Errors in high-precision mask making and metrology. Stanford University, 1996. pp. 82-84 (Year: 1996).*

Zhang, Mike Tao, and Ken Goldberg. "Calibration of wafer handling robots: A fixturing approach." 2007 IEEE International Conference on Automation Science and Engineering. IEEE, 2007. § II (Year: 2007).*

Jiang, Jun, et al. "Optimum design of a dual-range force sensor for achieving high sensitivity, broad bandwidth, and large measurement range." IEEE Sensors Journal 15.2 (2014): 1114-1123. Abstract, §§ I-II (Year: 2017).*

Cherala, Anshuman, et al. "Nanoscale magnification and shape control system for precision overlay in jet and flash imprint lithography." IEEE/ASME Transactions on Mechatronics 20.1 (2014): 122-132. Abstract, pp. 125-127 (Year: 2017).*

Deguchi, Kimiyoshi, Nobuyuki Takeuchi, and Akira Shimizu. "Evaluation of pressure uniformity using a pressure-sensitive film and calculation of wafer distortions caused by mold press in imprint lithography." Japanese journal of applied physics 41.6S (2002): 4178. pp. 4178-4180 (Year: 2002).*

Docter III, William A. Order reduction of nonlinear dynamic models by subspace identification and stepwise regression. Lehigh University, 1999. Abstract, pp. 2, 38-40, 177-186, 214 (Year: 1999).*

Lee, Heon. "Effect of imprinting pressure on residual layer thickness in ultraviolet nanoimprint lithography." Journal of Vacuum Science & Technology B: Microelectronics and Nanometer Structures Processing, Measurement, and Phenomena 23.3 (2005): 1102-1106. pp. 1104-1106 (Year: 2005).*

Lu, Yixin, et al. "Optimization of Process Corrections." 2008. Master Thesis. Technische Universiteit Eindhoven. Summary, pp. 3-7 and 27 (Year: 2008).*

Nelles, Oliver, and Oliver Nelles. Linear Dynamic System Identification. Springer International Publishing, 2020. § 18.5.6 (Year: 2020).*

Prakash, P. K. S., and Sean F. McLoone. "Plasma etch process virtual metrology using aggregative linear regression." 2011 International Conference of Soft Computing and Pattern Recognition (SoCPaR). IEEE, 2011. Abstract and § II (Year: 2011).*

Ringwood, John V., et al. "Estimation and control in semiconductor etch: Practice and possibilities." IEEE Transactions on Semiconductor Manufacturing 23.1 (2009): 87-98. Abstract and § III (Year: 2009).*

Roy, Nilabh, et al. "Overlay models for nanoimprint lithography." Journal of Micro/Nanopatterning, Materials, and Metrology 21.1 (2022): 011004-011004. Abstract, then see § 2.1 (Year: 2022).*

Baillieul, John, "Observability Canonical Form and the Theory of Observers," lecture notes, Nov. 15, 2012, Boston University, people(dot)bu(dot)edu/johnb/501Lecture19(dot)pdf (Year: 2012).*

Lewis, Lecture Notes, 2013, University of Texas at Arlington, URL: lewisgroup(dot)uta(dot)edu/Lectures/canonical%20forms(dot)pdf (Year: 2013).*

Stanford, "Converting to State-Space Form by Hand", URL: ccrma(dot)stanford(dot)edu/~jos/fp/Converting_State_Space_Form_ Hand(dot)html, accessed via the WayBack Machine with an archive date of Oct. 30, 2015 (Year: 2015).*

Massachusetts Institute of Technology, 2011, URL: ocw(dot)mit(dot)edu/ courses/6-241j-dynamic-systems-and-control-spring-2011/ 0823bbd7302593caa272304158502589_MIT6_241JS11_ chap12(dot)pdf (Year: 2011).*

Plett, State-Space Dynamic Systems (Continuous-Time), Lecture Notes for ECE 4520/5520: "Multivariable Control Systems I", URL: mocha-java(dot)uccs(dot)edu/ECE5520/ECE5520-CH02(dot)pdf, accessed via WayBack Machine with archive date of Nov. 2019 (Year: 2019).*

Oppenheim, "Properties of LTI State-Space Models", Chapter 5 of the Lecture Notes for Introduction to Communication, Control and Signal Processing, Massachusetts Institute of Technology OpenCourseWare, Spring 2010. (Year: 2010).*

National Instruments (hereinafter NI), System Identification Toolkit User Manual, Sep. 2004 Edition. URL: download(dot)ni(dot)com/ pub/gdc/tut/usermanual(dot)pdf (Year: 2004).*

MathWorks, article on "Canonical State-Space Realizations", URL: mathworks(dot)com/help/ident/ug/canonical-state-space-realizations(dot)html, accessed via the WayBack Machine, Archive Date: May 6, 2021. (Year: 2021).*

Nilabh Roy, Declaration under 73 CFR 1.130(a) for U.S. Appl. No. 17/525,511, filed Feb. 2025 (Year: 2025).*

* cited by examiner

Normalized Position Trace of Non-Contact Motion Trajectory
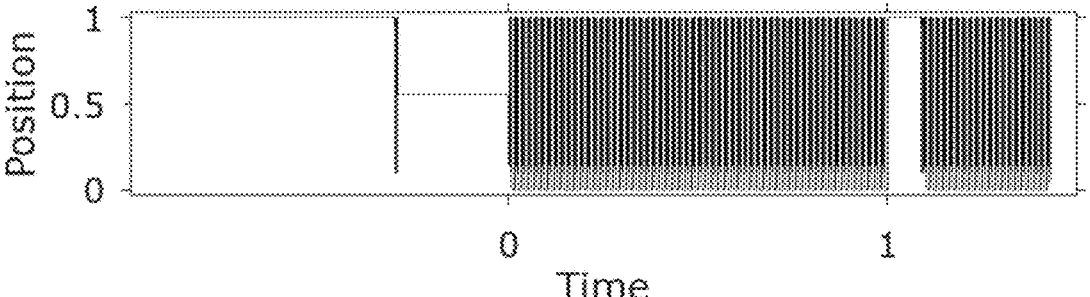
Normalized Force Trace of Non-Contact Motion Trajectory
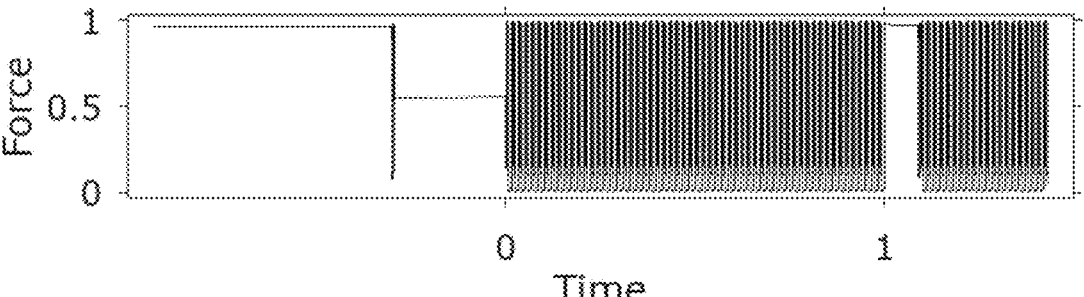
*FIG. 2*

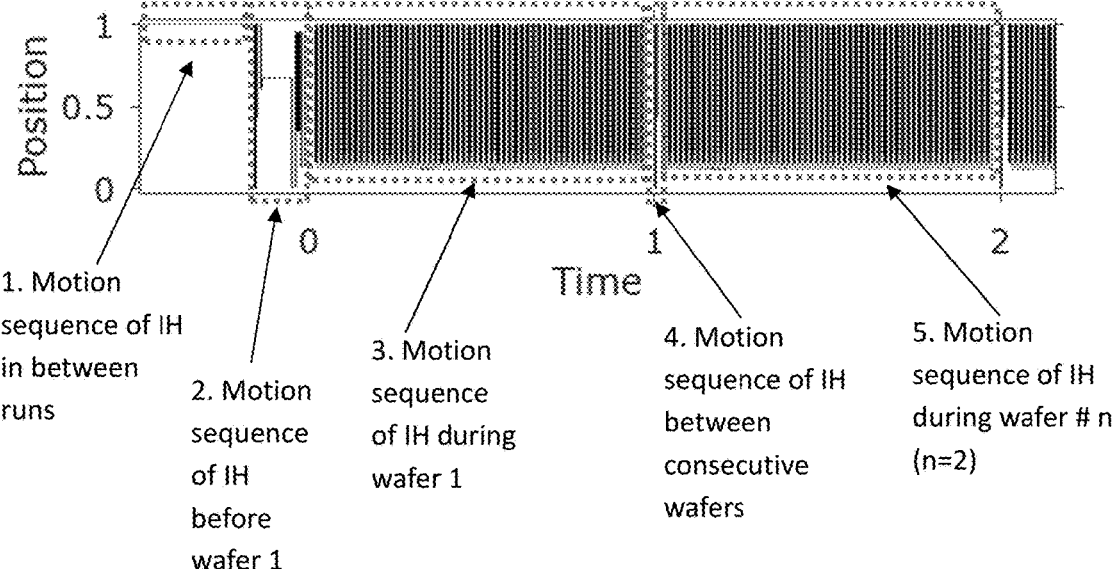

Normalized Position Trace of Imprinting Motion

1. Motion sequence of IH in between runs

2. Motion sequence of IH before wafer 1

3. Motion sequence of IH during wafer 1

4. Motion sequence of IH between consecutive wafers

5. Motion sequence of IH during wafer # n (n=2)

*FIG. 3*

Normalized Position Trace of Imprinting Motion

Calibration measurement sequence

Template mapping sequence before Wafer 1

*FIG. 4*

Normalized Position Trace of Imprinting Motion

Pre-OL sequence-
generally 0.5-1s

Imprint sequence- 3s, 5s, 10s,
17s etc.

Normalized Force Trace of Imprint Head

1. Emulated Motion
sequence of IH in
between runs

2. Emulated Motion sequence
of IH before wafer 1

3. Emulated Motion sequence
of IH during wafer 1

4. Emulated Motion
sequence of IH between
consecutive wafers

Normalized Position Trace of Non-Contact Motion Trajectory
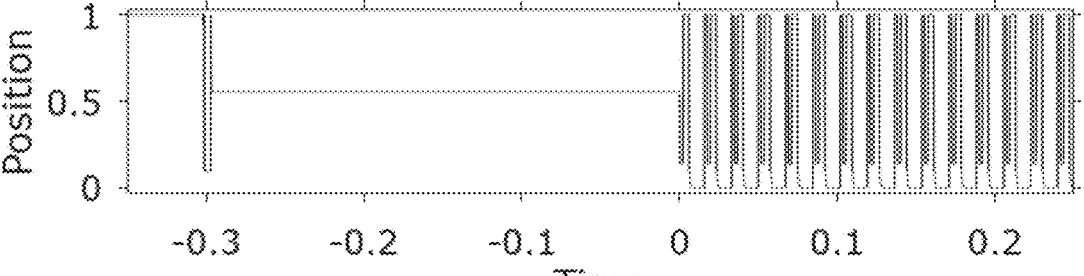
Normalized Force Trace of Non-Contact Motion Trajectory
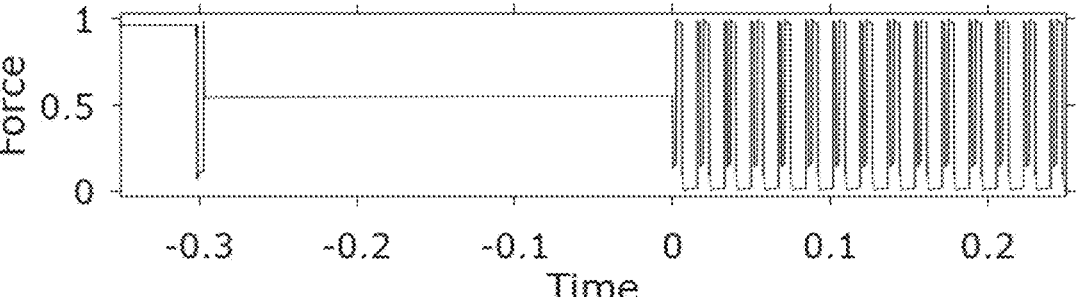
*FIG. 8*

Normalized Position Trace of Non-Contact Motion Trajectory
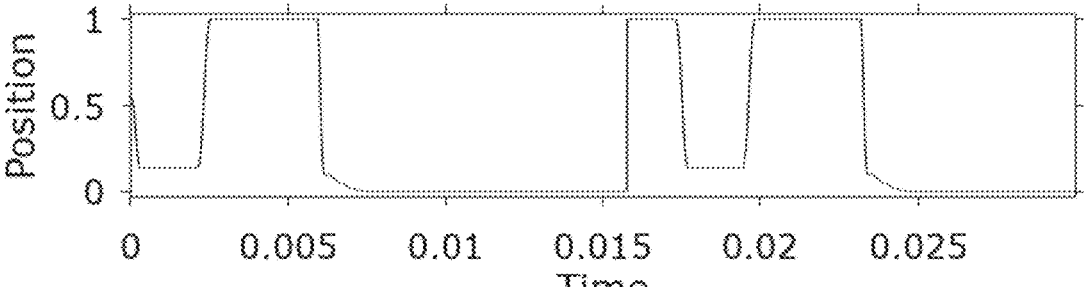
Normalized Force Trace of Non-Contact Motion Trajectory
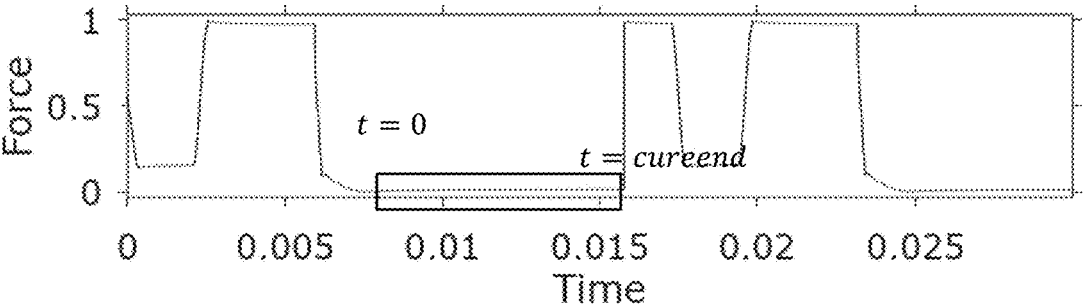
Normalized Disturbance Force
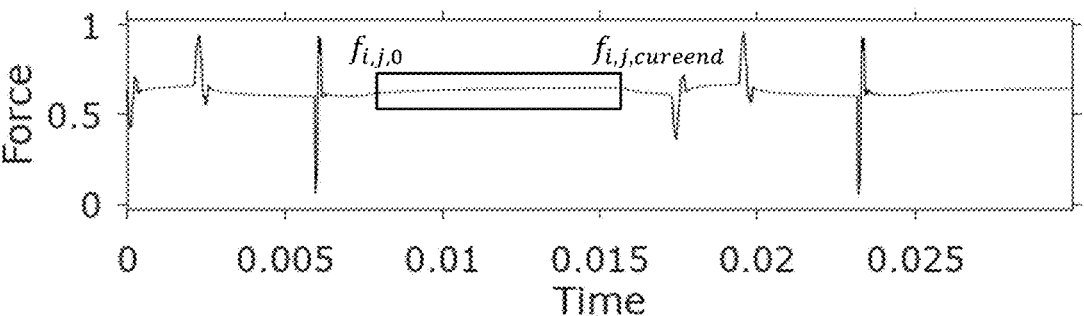
*FIG. 9*

Normalized Force Trace of Non-Contact Motion Trajectory
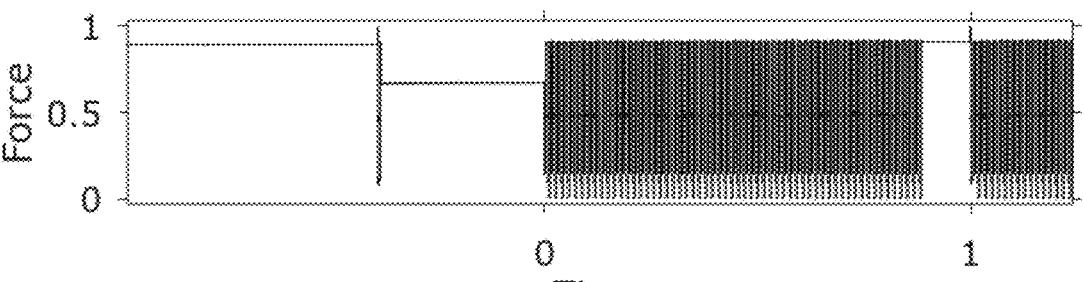
Normalized Position Trace of Non-Contact Motion Trajectory
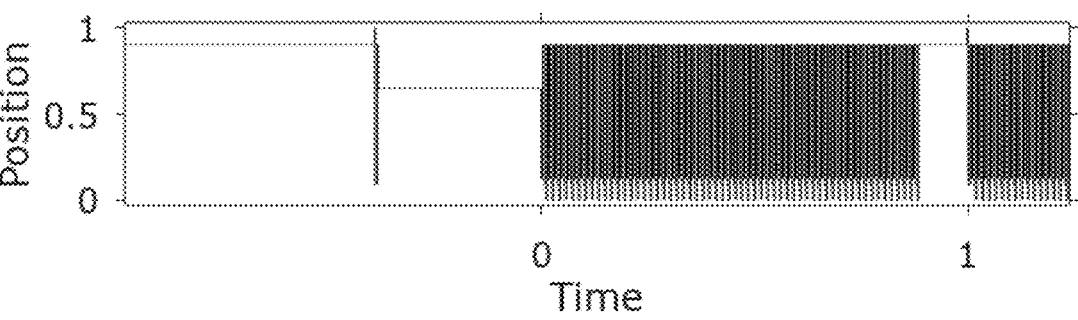
*FIG. 10*

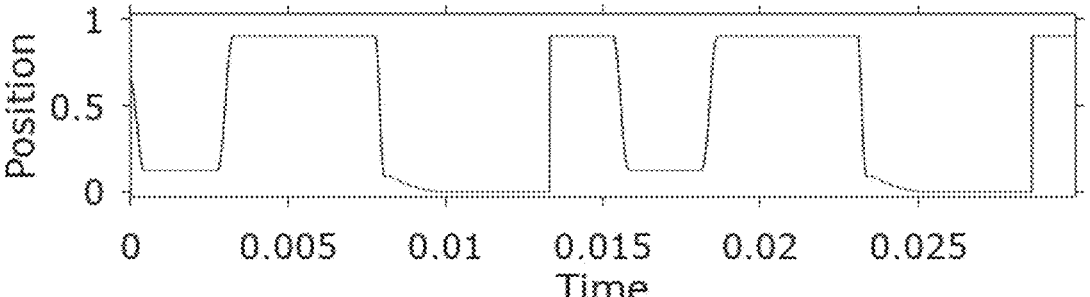
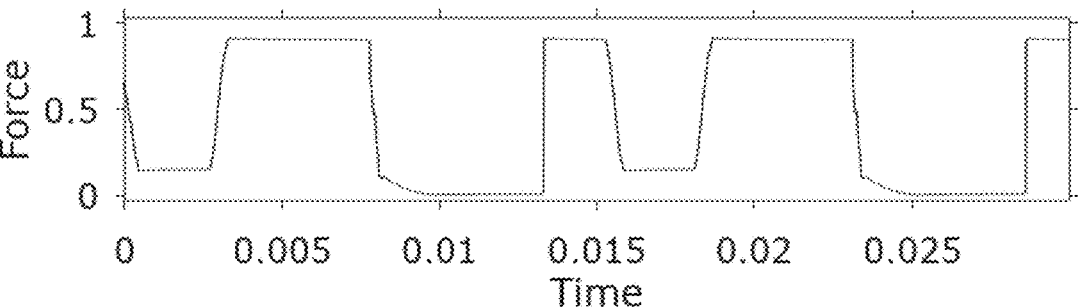
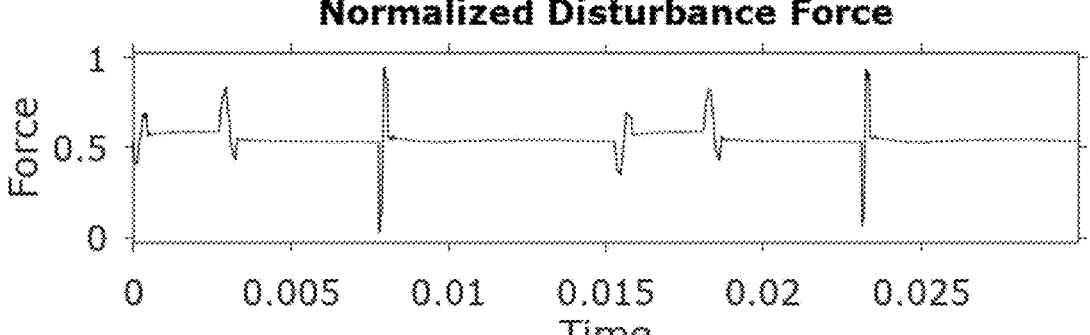
*FIG. 11*

METHOD FOR IMPROVING ACCURACY OF IMPRINT FORCE APPLICATION IN IMPRINT LITHOGRAPHY

BACKGROUND

Field of Art

The present disclosure relates to nanoimprint lithography, and more particularly, to a method for improving accuracy of final imprint force application in nanoimprint lithography.

Description of the Related Art

Nano-fabrication includes the fabrication of very small structures that have features on the order of 100 nanometers or smaller. One application in which nano-fabrication has had a sizeable impact is in the fabrication of integrated circuits. The semiconductor processing industry continues to strive for larger production yields while increasing the circuits per unit area formed on a substrate; therefore, nano-fabrication becomes increasingly important. Nano-fabrication provides for greater process control while allowing continued reduction of the minimum feature dimensions of the structures formed.

An exemplary nano-fabrication technique in use today is commonly referred to as nanoimprint lithography. Nanoimprint lithography is useful in a variety of applications including, for example, fabricating one or more layers of integrated devices such as CMOS logic, microprocessors, NAND Flash memory, NOR Flash memory, DRAM memory, MRAM, 3D cross-point memory, Re-RAM, Fe-RAM, STT-RAM, and the like. Exemplary nanoimprint lithography processes are described in detail in numerous publications, such as U.S. Pat. Nos. 8,349,241, 8,066,930, and 6,936,194, all of which are hereby incorporated by reference herein.

A nanoimprint lithography technique disclosed in each of the aforementioned U.S. patents includes formation of a relief pattern in a formable (polymerizable) layer and transferring a pattern corresponding to the relief pattern into and/or onto an underlying substrate. The substrate may be coupled to a motion stage to obtain a desired positioning to facilitate the patterning process. The patterning process uses a template spaced apart from the substrate and a formable liquid applied between the template and the substrate. The formable liquid is solidified to form a solid layer that has a pattern conforming to a shape of the surface of the template that contacts the formable liquid. After solidification, the template is separated from the rigid layer such that the template and the substrate are spaced apart. The substrate and the solidified layer are then subjected to additional processes, such as etching processes, to transfer a relief image into the substrate that corresponds to the pattern in the solidified layer. The patterned substrate can be further subjected to known steps and processes for device fabrication, including, for example, oxidation, film formation, deposition, doping, planarization, etching, formable material removal, dicing, bonding, packaging, and the like.

SUMMARY

A method for identifying a model for modeling cable stress relaxation dynamics of an imprint head is provided. The method includes performing a non-contact imprint test run for a predetermined number of wafers. Data from a force trace and a position trace of the imprint head during the non-contact imprint test run are collected to compute cable stress relaxation forces. A model having a plurality of different model orders is generated. A set of parameters of the model for each model order is identified. Residual sum of squares for wafer average error for each of the model orders is calculated based on the obtained cable stress relaxation forces. The set of parameters of one of the plurality of model orders may be based on a difference in the residual sum of squares for wafer average error between the one of the plurality of model orders and a next higher model.

The non-contact imprint test run may include a first motion sequence, a second motion sequence, a third motion sequence, and a fourth motion sequence of the imprint head. During the first motion sequence, the imprint head may idle at an up-plane with respect to an imprint plane before starting the imprint test run. The second motion sequence of the imprint head before starting imprint on a first wafer may include a calibration measurement routine and a template mapping routine during which the imprint head moves to different planes. The third motion sequence may include an imprint motion sequence and a metrology sequence. In the fourth motion sequence of imprint head after the third motion sequence before starting imprint on a second one of the plurality of wafers, the imprint head may idle at the up-plane and then moves along a calibration measurement routine during the fourth motion sequence. The times spent for each of the first to fourth motion sequence may be tunable.

The model may be generated with a state-space representation as:

$$\dot{x}(t) = Ax(t) + Bu(t)$$

$$f_{model}(t) = Cx(t) + Du(t)$$

with the sets of parameters A, B, C, and D as:

$$A = \begin{bmatrix} 0 & 1 & 0 & \dots & 0 \\ \vdots & \vdots & \ddots & \ddots & 0 \\ -a_n & -a_{n-1} & \dots & \dots & -a_1 \end{bmatrix};$$

$$B = \begin{bmatrix} 0 \\ \vdots \\ 1 \end{bmatrix}; C = [\, b_n \ \dots \ \dots \ b_0 \,]; D = k_0$$

where x(t) are state variables at time t, u(t) are positions of the imprint head at time t, $k_0$, $a_n$, $a_{n-1}$, . . . , $a_1$ and $b_n$, $b_{n-1}$, . . . , $b_1$ are scalar parameters to be determined by fitting and $f_t$ is force disturbance due to cable stress relaxation. The sets of parameters A, B, C, and D may also be:

$$A = \begin{bmatrix} -\lambda_1 & 0 & 0 & \dots & 0 \\ \vdots & \vdots & \ddots & \ddots & 0 \\ 0 & 0 & \dots & \dots & -\lambda_n \end{bmatrix};$$

$$B = \begin{bmatrix} \lambda_1 \\ \vdots \\ \lambda_n \end{bmatrix}; C = [\, k_1 \ \dots \ \dots \ k_n \,]; D = 0$$

where $\lambda_1$, $\lambda_2$, . . . , $\lambda_n$ are poles related to time constants $T_1$, $T_2$, . . . , $T_n$ of constituent first order systems as $\lambda_i = 1/T_i$.

The method according to Claim 1, wherein the wafer average error can be calculated as:

$$e_{i,Cureend} = \frac{1}{p}\sum_{j=1}^{p}(f_{i,j,Cureend} - f_{model,i,j,Cureend}),$$

where $f_{i,j,curend}$ is an actual force disturbance due to cable stress relaxation at an end of the curing process, and $f_{model,i,j,curend}$ is a model force disturbance due to cable stress relaxation at the end of the curing process. The residual sum of square for wafer aver error can be calculated as:

$$RSS = \sum_{i=1}^{q} e_{i,Cureend}^2.$$

Further in the method, an F value $F_{calc}$ based on the residual sum of squares for the wafer average error is calculated. The calculated F value $F_{calc}$ is compared with a critical F value $F_{cr}$ of the same degrees of freedom. The one of the plurality of model orders includes a lowest model order among the plurality of model orders satisfying a condition of $F_{calc} < F_{cr}$ and then selecting ta (n−1)th order model or a lower order model tested for predicting the force disturbances during the imprinting process. $F_{calc}$ is calculated from:

$$F_{calc} = \frac{\frac{RSS_{lower} - RSS_{higher}}{x_{higher} - x_{lower}}}{\frac{RSS_{higher}}{N - x_{higher}}},$$

where $RSS_{lower}$ is the residual sum of squares for wafer average error of the one of the plurality of model orders, $RSS_{higher}$ of the residual sum of squares for wafer average error of the next higher model order, $x_{lower}$ is a number of independent parameters in the one of the plurality model order, $x_{higher}$ is the number of independent parameters of the next higher order model, and N is the predetermined number of wafers.

A method of manufacturing an article is also provided. The imprint head is exercised along a preconditioning trajectory before contacting the template with a formable material to be applied on a substrate. The template is retained with the imprint head, and the formable material is applied to the substrate. The imprint is moved to bring the template in contact with the formable material. An imprinting process is then performed on the formable material with a final imprint force that is adjusted based on the model prediction of force disturbance caused by cable stress relaxation in real time.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

So that features and advantages of the present invention can be understood in detail, a more particular description of embodiments of the invention may be had by reference to the embodiments illustrated in the appended drawings. It is to be noted, however, that the appended drawings only illustrate typical embodiments of the invention and are therefore not to be considered limiting of its scope, for the invention may admit to other equally effective embodiments.

FIG. 2 shows an example of a non-contact imprint run position & force traces

FIG. 3 shows various motion sequences of an imprint head routine during an imprint run and is an expanded view of a second motion sequence of the imprint routine as shown in FIG. 2;

FIG. 4 is an expanded view of the second motion sequence of the imprint routine as shown in FIG. 3;

FIG. 8 shows force and position traces of an imprint head during an imprint test run in a first example;

FIG. 9 shows cable stress relaxation forces $f_r$ are obtained by removing the well-defined static and dynamic component of imprint head dynamics from the force trace as shown in FIG. 8;

FIG. 10 shows force and position traces of an imprint head during an imprint test run in a second example; and FIG. 11 shows cable stress relaxation forces $f_r$ are obtained by removing the well-defined static and dynamic component of imprint head dynamics from the force trace as shown in FIG. 10.

Figure 1:
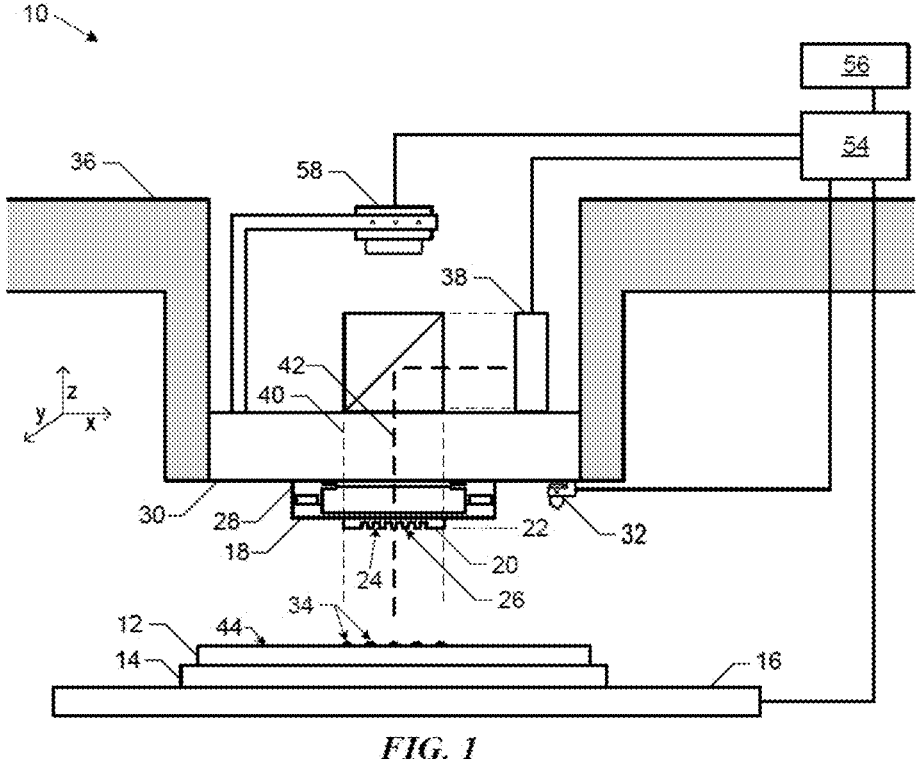
FIG. 1 is a diagram illustrating an apparatus.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Nanoimprint System

FIG. 1 illustrates a nanoimprint lithography apparatus 10 in which an embodiment may be implemented. Apparatus 10 may be used to form a relief pattern on substrate 12. Substrate 12 may be coupled to substrate chuck 14. As illustrated, substrate chuck 14 is a vacuum chuck. Substrate chuck 14, however, may be any chuck including, but not limited to, vacuum, pin-type, groove-type, electrostatic, electromagnetic, and/or the like.

Substrate 12 and substrate chuck 14 may be further supported by positioning stage 16. Stage 16 may provide translational and/or rotational motion along one or more of the x, y, z, $\theta$, and $\phi$ axes. Stage 16, substrate 12, and substrate chuck 14 may also be positioned on a base (not shown).

Spaced-apart from substrate 12 is template 18. Template 18 may include a body having a first side and a second side with one side having a mesa 20 (also referred to as mold 20) extending therefrom towards substrate 12. Mesa 20 may have a patterning surface 22 thereon. Alternatively, template 18 may be formed without mesa 20.

Template 18 and/or mold 20 may be formed from such materials including, but not limited to, fused-silica, quartz, silicon, organic polymers, siloxane polymers, borosilicate glass, fluorocarbon polymers, metal, hardened sapphire, and/or the like. As illustrated, patterning surface 22 comprises features defined by a plurality of spaced-apart recesses 24 and/or protrusions 26, though embodiments of the present invention are not limited to such configurations (e.g., planar surface). Patterning surface 22 may define any original pattern that forms the basis of a pattern to be formed on substrate 12. Alternatively, template surface 22 may be blank, i.e. without pattern features, in which case a planar surface can be formed on the substrate. In an alternative embodiment, when the patterning surface 22 is of the same areal size as the substrate, a layer can be formed over the entire substrate (e.g., whole substrate processing).

Template 18 may be coupled to template chuck 28. Template chuck 28 may be configured as, but not limited to, vacuum, pin-type, groove-type, electrostatic, electromagnetic, and/or other similar chuck types. Further, template chuck 28 may be coupled to the imprint head 30 which in turn may be moveably coupled to bridge 36 such that template chuck 28, head 30 and template 18 are moveable in at least the z-axis direction.

Apparatus 10 may further comprise a fluid dispense system 32. Fluid dispense system 32 may be used to deposit formable material 34 (e.g., polymerizable material) on substrate 12. Formable material 34 may be positioned upon substrate 12 using techniques such as drop dispense, spin-coating, dip coating, chemical vapor deposition (CVD), physical vapor deposition (PVD), thin film deposition, thick film deposition, and/or the like. Formable material 34 may be disposed upon substrate 12 before and/or after a desired volume is defined between mold 22 and substrate 12 depending on design considerations.

Fluid dispense system 32 may use different technologies to dispense formable material 34. When the formable material 34 is capable of jetting, ink jet type dispensers may be used to dispense the formable material. For example, thermal ink jetting, microelectromechanical systems (MEMS) based ink jetting, valve jet, and piezoelectric ink jetting are common techniques for dispensing jettable liquids.

Apparatus 10 may further comprise radiation source 38 that directs actinic energy 40 along path 42. Imprint head 30 and stage 16 may be configured to position template 18 and substrate 12 in superimposition with path 42. Camera 58 may likewise be positioned in superimposition with path 42. Apparatus 10 may be regulated by processor 54 in communication with stage 16, head 30, fluid dispense system 32, source 38, and/or camera 58 and may operate on a computer readable program stored in memory 56.

Either head 30, stage 16, or both vary a distance between mold 20 and substrate 12 to define a desired volume therebetween that is filled by formable material 34. For example, imprint head 30 may apply a force to template 18 such that mold 20 contacts formable material 34. After the desired volume is filled with formable material 34, source 38 produces actinic energy 40 (e.g., ultraviolet radiation) curing the formable material 34, that is, causing formable material 34 to solidify and/or cross-link conforming to a shape of substrate surface 44 of substrate 12 and patterning surface 22 of template 18, defining a formed layer on substrate 12. In an embodiment, the substrate 12, may be a substrate, an unpatterned template, or some other object on which the formable material 34 is shaped by the template 18.

Stress Relaxation Model

During the imprinting process, a contact force is exerted by the template against the formable material on the substrate at the end of the curing process before separation of substrate and the template. A contact force is also applied against the formable material on the substrate prior to the curing while the formable material is spreading. In an embodiment, the substrate may be a semiconductor wafer, a blank template, or some other object on which the formable material 34 is shaped by the template 18. Such contact force applied at the end of curing is often referred to as a final imprint force (FIF). The final imprint force is one of the critical parameters that needs to be controlled with high precision for example a 0.01, 0.05, 0.1, 0.5, or 1 N (newton) precision on the tool to achieve the target overlay specification for nanoimprint lithography. Measurement of this final imprint force during the imprinting process is extremely difficult as contact-based force sensors can be intrusive to the imprinting process and may significantly affect the alignment, overlay, and other process specifications. The imprinting head is actuated in force control when the template is in contact with the resist on the substrate, thus a direct estimation of exerted force based on estimate of current flowing through the voice coils may not capture the true force exerted on the formable material due to disturbances from for example cable stress relaxation in the cables and tubings attached to the imprint head 30.

Currently, the resulting FIF as-imprinted can be characterized after imprinting from overlay distortion data measurements, for example, Archer™ AIM mark measurements. A typical tool that may be used for measuring overlay is an Archer™ 750, that is available from KLA Corporation of Milpitas, CA, USA. The FIF that was used can be estimated based on measured overlay (based on Archer AIM mark measurements) of an imprinted film as described in US Patent Publication No. 2019/0033709-A1 which is hereby incorporated by reference. This force data calculated from Archer data is referred to as Archer FIF. However, Archer FIF is a post-imprint measurement that is unable to control FIF precisely during the imprinting process. To control FIF precisely during the imprinting process, the force is estimated by calibrating the non-contact imprint force at a set-position and then estimating the total imprint force through the commanded currents running through the imprint head voice coils. However, it has been observed that this calibration of non-contact force is not accurate and repeatable sufficiently under external disturbance to hit the target specification of about say, 0.05, 0.1, or 0.2 N variation in Archer FIF across multiple runs, and thus, overlay is degraded. In other words, FIF is difficult to control as it is hypothesized that FIF disturbances are related to dynamic behavior of the stress relaxation in cables & tubings attached to the imprint head 30.

The applicant has determined that a leading cause of an error in estimating the force is the development and relaxation of stress in the cables and tubes connected to the imprint head 30 as the imprint head 30 moves between different positions. This behavior has been found to be motion profile dependent and can depend upon many factors including the step size between the initial and final positions of the imprint head 30, velocity of the imprint head 30 from the initial position to the final position, all previous states of the cables and tubes including the initial stress in the cables and tubing connected to the imprint head 30 and/or template chuck 28 in the setup of the imprint apparatus. As the stress relaxation in the cables and/or tubing can be modeled using viscoelastic models, a dynamic model for cable relaxation can be developed, and such model can be used to predict cable stress relaxation disturbances that affects the FIF.

One embodiment to identify a suitable model for modeling the dynamics of cable stress relaxation that are representative of the duty cycles of the imprint head during a nanoimprint lithography process includes two steps. The first step includes a non-contact imprint head motion trajectory design to collect the position and disturbance force traces that are representative of the duty cycles of the imprint head during an NIL process. The total force traces for the non-contact imprint head may be determined based on the commanded currents running through the imprint head voice coils. Subsequently, the disturbance force due to cable stress relaxation is estimated by removing the static force estimates (due to elastic repeatable elastic forces of flexures, springs, or any other motion guiding elastic mechanism in the imprint head 30) from the total force traces. The second step includes selection of a suitable model structure using an order selection criterion based on FIF specification requirement to meet desired overlay on the device. In other words, the embodiment measures a non-contact imprint head motion that is identical (or close) to the imprint head motion trajectory by predicting imprint head motion using multiple models and identifying the model that sufficiently describes the dynamics of cable stress relaxation associated with motion of the imprint head 30 and also meets a modeling criterion based on FIF requirements. Further details of the method to identify a suitable model for modeling the dynamics of cable stress relaxation are discussed as follows.

Based on the underlying physics of stress relaxation in the cables, a linear dynamic model of the stress relaxation in cables has been developed to estimate force disturbance at any time instant using the prior motion history of the imprint head as:

$$\dot{x}(t)=Ax(t)+Bu(t)$$

$$f(t)_{model}=Cx(t)+Du(t)$$

or $$f(t)_{model}=g(x(t), \dot{x}(t), u(t))$$

where $x(t)$ is a vector of the state variables at any time t, $\dot{x}(t)$ is a time derivative of the state variables $x(t)$ at time t, $u(t)$ is the imprint head position in the motion direction at time t, and $f(t)_{model}$ is the estimated force disturbance due to stress relaxation of the cables. This model is typically obtained by estimating the parameters A, B, C, and D using the position and force traces of the imprint head during a previous calibration routine or imprint as shown in FIG. 2. The calibration routine may be a non-contact motion trajectory as shown in FIG. 2 that is an approximation of the motion of the imprint head during the imprinting process. Additionally, if the cable stress relaxation dynamics are non-linear in nature, a non-linear dynamic model, g could be identified.

Typically, both force and position traces are required at the imprint plane to accurately estimate the stress relaxation behavior of the cables and tubing during imprint process in this model development process. However, during a typical imprint process, since the imprint head transitions to a force control algorithm when in contact with formable material, the observability of cable stress relaxation force disturbance is lost. Therefore, to obtain the force traces at the imprint plane in a sequence close to the imprint sequences, a non-contact exercising routine test for the imprint head 30 run solely in position control has been developed. With the imprint head 30 in position control during the exercising routine, observability of cable stress relaxation magnitude at all times in the force traces is regained when the imprint head is at the imprint plane. Position control means that the imprint head 30 is driven along a desired position trajectory (for example, the non-contact test trajectory) in which one more position sensor are used as feedback to control the motion of the imprint head along the desired position trajectory. The non-contact test trajectory is designed to be as close to the imprint process motion sequence as possible in terms of its duty cycle between the up-plane and the imprint plane without significant software development burden.

An example of the non-contact motion trajectory generation is illustrated in FIG. 3. As shown in FIG. 3, the typical imprint head motion trajectory during an imprint run has been divided into five (5) different motion sequences. Before starting an imprint run, or between two consecutive imprint runs, the imprint head (IH) 30 rests at a position without movement. For example, as shown in the first motion sequence of FIG. 3, the imprint head IH rests or idles at an up-plane such as a position near zero (0 m) as no motion of the imprint head can be detected.

Before the imprint process of the first wafer (wafer 1) in a series of imprinting wafers, the second motion sequence includes a calibration measurement routine of the imprint head and a template mapping/metrology routine. FIG. 4 is an expanded view of the second motion sequence. As shown in FIG. 4, the second motion sequence is divided into two sub-sequences, including the calibration measurement motion sequence, followed by the template mapping sequence before starting the imprint process of wafer 1.

Figure 5:
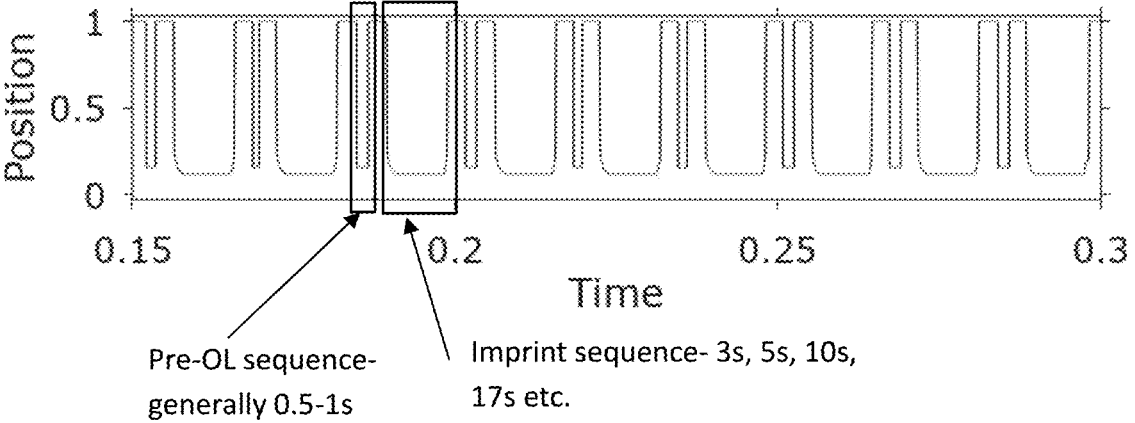
FIG. 5 is an expanded view of the third motion sequence of the imprint routine as shown in FIG. 3.

FIG. 5 is an expanded view of the third motion sequence, that is, the motion sequence of imprint process on the first wafer (wafer 1) in the current imprint run. The motion sequence of the imprint process not only applies to the wafer 1, but also applies to the remaining wafers, wafer 2 to wafer # n in the current imprint run. As shown in FIG. 5, the third motion sequence includes a series of repetitive imprint head movements, each of which can include a pre-overlay (OL) sequence and an imprint sequence. In the embodiment as shown in FIG. 5, the pre-OL sequence lasts for about 0.25, 0.5, 1, or 1.5 seconds, and the imprint sequence lasts for about 0.5 second, 1 second, 4 seconds, 5 seconds, 10 seconds, 17 seconds, . . . , etc.

Once the imprint process on wafer 1 is complete, the imprint head IH moves to the idle position preparing for the imprint process of the next wafer in the fourth motion sequence. The fourth motion sequence between two imprint processes of two consecutive wafers may include an idle state of the imprint head IH at an up-plane, and a calibration measurement routine. Referring to FIG. 3, the fifth motion sequence includes the imprint process performed on the next wafer.

Figure 6:
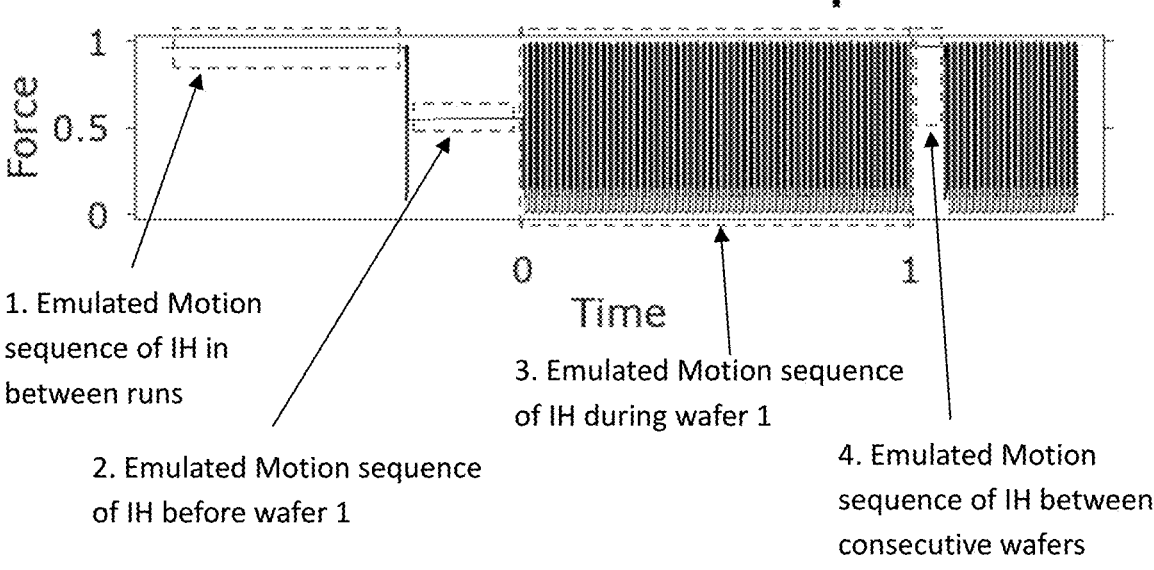
FIG. 6 shows a tunable trajectory sequence for imprint head exercising in non-contact according to one embodiment.

To emulate a motion sequence similar to that of an imprint run, a tunable trajectory sequence comprising the first to fourth motion sequences and timing parameters are proposed as shown in FIG. 6. In the first emulated motion sequence, the imprint head rests or idles at the up-plane. The idling time length and the idle plane position may be adjustable. In the second emulated motion sequence, metrology, and calibration sequence that the imprint head moves along before starting a run of the wafer is emulated. For example, the imprint head IH may move to another plane different from the imprint plane and the up-plane and stay at the different plane for different time durations, depending upon the metrology sequence for the process such as 100 seconds at a plane of about 200 μm below the up-plane. The plane where the imprint head IH moves to and the time length for the imprint head to stay at the plane are both tunable. The third emulated motion sequence involves movement of the imprint head IH from the up-plane in between consecutive imprint movements, followed by stay of the imprint head IH at the imprint plane for nominal spread-cure time duration of the process and then movement of the imprint head IH back to the up-plane. The time duration at the imprint plane may be adjustable as, for example, 3 seconds, 5 seconds, 7 seconds, 10 seconds, 15 seconds, 17 seconds, 20 seconds, or 30 seconds. The metrology sequence may include 0.5 seconds idling at the up-plane, and then move to the metrology plane, which may be different from the imprint place such as 20 μm higher than the imprint plane. The imprint head IH may stay at the metrology plane for about 0.5 second, and then moves back to the up-plane for about 1 second. The fourth emulated motion sequence emulates the idling of the imprint head IH between imprint process of two consecutive wafers. The idling time may be around 20 seconds to match with the actual motion sequence for the next wafer.

A combination of different fluid spread times may be included in the non-contact test to obtain the IH cable assembly response to different frequency input motion and achieve unbiased and unskewed models. Using force and position traces from the above tests, a set of model parameters can be identified using least square regression, optimization, system identification or any other model identification approach. The objective function to minimize for the problem is generally to minimize the error squared between the actual force disturbance at the imprint plane and the model predicted force disturbance at the imprint plane when the position of the imprint head IH has settled and converged to the desired position. This definition can be extended to include minimizing the error squared for all steady state positions of the imprint head.

Identifying a minimal set of parameters is important for a model order to obtain unique set of parameters for each model order. To identify a model, over fitting, that is, if there are more parameters than required in a minimal system (overfitting), may lead to poor identification of parameters and poor model robustness depending upon the initial conditions and noise. For example, for a first order model of the system, a maximum of two independent parameters may be identified. For a second order system, a maximum of four independent parameters are needed. For a third order system, a maximum of six independent parameters. For fourth order system, a maximum of eight independent parameters are needed. Any model order form which uses more parameters than the above limits will have some redundant/dependent parameters in it and a small change in the input or initial guess may provide a different set of parameters that makes the solution overly sensitive to noise in the signal and initial conditions. In addition to being error prone, that is, less robust, an overfitting model also presents additional time and computational complexity during model identification as well as during actual execution and implementation of the model in real time for disturbance force prediction and correction. Thus, it is important to use a correct minimal order representation of the model. There might be some need for an additional parameter in each of the above cases to correct the errors between the actual force offset between different planes and a linear stiffness approximation. A method to select a model for the cable stress relaxation for the imprint head is presented as follows.

To select a model for the cable stress relaxation for the imprint head, force and position traces are obtained from the non-contact test discussed above. A general nth order transfer function is fitted to the position and force data as:

$$G(s) = \frac{F_{model}(s)}{U(s)} = \frac{\left(b_0 s^{n-1} + b_1 s^{n-2} + \ldots + b_n\right)}{s^n + as^{n-1} + \ldots + a_n},$$

Where $F_{model}(s)$ and $U(s)$ are the Laplace transform of $f_{model}(t)$ and $u(t)$. In an embodiment, the Z-transform may be used instead of the Laplace transform for discrete time series of the position and force data. Alternatively, any state-space representation of the above model such as controllable canonical form may be fitted to the position and force data as:

$$\dot{x}(t) = Ax(t) + Bu(t)$$

$$f_{model}(t) = Cx(t) + Du(t)$$

Where $$A = \begin{bmatrix} 0 & 1 & 0 & \ldots & 0 \\ 0 & 0 & 1 & \ldots & 0 \\ \vdots & \vdots & \vdots & \ddots & \vdots \\ -a_n & -a_{n-1} & \ldots & \ldots & -a_1 \end{bmatrix}; B = \begin{bmatrix} 0 \\ \vdots \\ 1 \end{bmatrix}; C = [\, b_n \ \ldots \ \ldots \ b_0 \,]; D = 0,$$

or

Wherein A is a n×n matrix, B is a n×1 matrix and C is a 1×n matrix, D is scalar value, and n is the number of state variables and the order of the model. A typical transfer function G(s) like above may be represented as state space as described above in which the scalar value D is zero. The scalar value D may represent the static spring forces which may be removed during a calibration step. Alternatively, the model can also include a const. D term to model the total repeatable spring forces in the imprint head motion. An example of such a transfer function would be:

$$G(s) = \frac{F_{model}(s)}{U(s)} = k_0 + \frac{\left(b_0 s^{n-1} + b_1 s^{n-2} + \ldots + b_n\right)}{s^n + as^{n-1} + \ldots + a_n}$$

and D in the state space representation would be equal to $k_0$. An observable canonical form or a modal canonical form of the dynamics is also shown below. In a modal canonical form, the transfer function model is decomposed into the following form:

$$G(s) = \frac{k_1}{s + \lambda_1} + \frac{k_2}{s + \lambda_2} + \ldots \frac{k_n}{s + \lambda_n};$$

Where $\lambda_1, \lambda_2, \ldots, \lambda_n$ are the poles of the systems, and $k_1, k_2, k_n$ are the DC gains of each of the n first order systems when the dynamics of cable stress relaxation is represented as a combination of n first order systems. The corresponding state space of the following observable canonical form with suitable choice of state variables will be:

$$A = \begin{bmatrix} -\lambda_1 & 0 & 0 & \ldots & 0 \\ \vdots & \vdots & \ddots & \ddots & 0 \\ 0 & 0 & \ldots & \ldots & -\lambda_n \end{bmatrix};$$

$$B = \begin{bmatrix} \lambda_1 \\ \vdots \\ \lambda_n \end{bmatrix}; C = [\, k_1 \ \ldots \ \ldots \ k_n \,]; D = 0$$

Poles $\lambda_1, \lambda_2, \ldots, \lambda_n$ are related to the time constants $T_1, T_2, \ldots, T_n$ of the n first order systems are as:

$$\lambda_i = \frac{1}{T_i}$$

State space realizations of the models depend on the choice of state variables; and hence, there could be multiple state space realizations modeling the same dynamics as described above. The above state space representation of the system will be used to ensure a minimal set of independent parameters are used for modeling the dynamics of cable stress relaxation.

An optimization or regression system identification program to find the parameters of the model is written. The objective of the program is to minimize the sum of squared errors between the actual force trace and the model force trace when the imprint head IH is idling at any plane, that is, when the imprint head IH has stabilized in position. In other words, dynamics of imprint head IH such as dynamics of springs and flexures in the imprint head have stabilized. The minimization objective for the optimization an objective function O may be defined as the sum of squared errors when the imprint head 30 is at the imprint plane may be determined as:

$$O = \sum_{i=1}^{q} \sum_{j=1}^{p} \sum_{t=0}^{cureend} (f_{i,j,t} - f_{model,i,j,t})^2$$

Where $f_{i,j,t}$ is the measured force during the non-contact force trajectory at a time t associated with imprinting of field j of wafer i; $f_{model,i,j,t}$ is the modeled force at a time t associated with the imprinting of field j of wafer i; the time cureend is a time (t) at the end of curing for each field j on wafer i; t=0 is a time at which the imprint head 30 has reached the imprinting plane associated with each imprint field j on wafer i as illustrated in FIG. 9; p is the number of imprint fields modeled such as 58 or 84 for each wafer; and q is the number of wafers modeled in the non-contact run.

The purpose of the optimization is to find the model parameters (parameters in A, B, C, and D) that minimize the above defined objective function (O). The lower limit and the upper limit of the model parameters (parameters in A, B, C, and D) are set at, for example, 0 and 100000 in suitable physical units and can vary from system to system. One can initiate the optimization algorithm by supplying an initial guess of the parameters if needed. In another embodiment, different wafers could be weighted ($w_i$) differently to account for different time scale effects or different FIF stability criteria where short-term accuracy of the model is more important than mid-term or long-term accuracy.

$$O = \sum_{i=1}^{q} w_i \sum_{j=1}^{p} \sum_{t=0}^{cure\ end} (f_{i,j,t} - f_{model,i,j,t})^2$$

The parameters and the corresponding error between the model and actual force traces are then identified to minimize the objective function (O) within the constraints on the parameters. The error between the model force and the actual force at the time corresponding to the end of UV cure for each shot is also computed.

The model order is identified by starting with n=0 or 1 (zeroth or first order system). That is, $$G(s) = b_0 (\text{for } n = 0)$$

or

-continued $$G(s) = \frac{b_0}{s + a_1}(\text{for } n = 1)$$

And the corresponding state space model for n=1 can be reformulated as $$\dot{x}(t) = Ax(t) + Bu(t)$$

$$f_{model} = Cx(t) + Du(t)$$

$$A = \left[-\frac{1}{T_1}\right]; B = \left[\frac{1}{T_1}\right]; C = [k_1]; D = 0;$$

The residual sum of squares RSS for the wafer average error $e_{i,Cureend}$ of the corresponding model order is computed as for n=1:

$$e_{i,Cureend} = \frac{1}{p}\sum_{j=1}^{p}(f_{i,j,Cureend} - f_{model,,j,Cureend})$$

$$RSS_{n=1} = \sum_{i=1}^{q} e_{i,Cureend}^2$$

Where $f_{i,j,cureend}$ is the measured force during the non-contact force trajectory at a time at or near a time that would be associated with the end of cure for imprinting of field j of wafer i; and $f_{model,i,j,t}$ is the modeled force at a time t associated with the imprinting of field j of wafer i. Alternatively, to average out the impact of signal noise on this error computation, the model error representative of cure end can be an average estimate over a specified duration, $\Delta$ (say 20 ms, 50 ms, or 100 ms) close to cure end i.e.

$$e_{i,Cureend} = \frac{1}{p}\sum_{j=1}^{p}\left(\frac{1}{NS}\sum_{t=Cureend-\Delta}^{Cureend}(f_{i,j,t} - f_{model,i,j,t})\right)$$

Where, NS is the total number of signal samples over the specified duration, $\Delta$. Moving to the next order model estimation, say n=2 (or 1 if starting with n=0), $$G(s) = \frac{b_0 + b_1 s}{s^2 + a_1 s + a_2}$$

or $$\dot{x}(t) = Ax(t) + Bu(t)$$

$$f(t)_t = Cx(t) + Du(t);$$

$$A = \begin{bmatrix} -\frac{1}{T_1} & 0 \\ 0 & -\frac{1}{T_2} \end{bmatrix}; B = \begin{bmatrix} \frac{1}{T_1} \\ \frac{1}{T_2} \end{bmatrix}; C = [k_1 \ k_2]; D = 0$$

$T_1$ and $T_2$ can be considered as the time constants of first order systems when the original second order model is decomposed into two first order systems, and $k_1$ and $k_2$ are the DC gains of the first order systems.

The residual sum of squares for the wafer average error for the corresponding model order is:

$$RSS_{n=2} = \sum_{i=1}^{q} e_{i,Cureend}^2$$

Hypothesis testing is performed to determine whether the improvement in residual sum of squares of the modeled wafer average error by increasing the model order, n is significant or not. The F value is then computed by:

$$F_{calc} = \frac{\dfrac{RSS_{lower} - RSS_{higher}}{x_{higher} - x_{lower}}}{\dfrac{RSS_{higher}}{N - x_{higher}}}$$

Where $x_{higher}$=number of independent parameters in the higher order model $X_{lower}$=number of independent parameters in the lower order model N=number of samples (# of wafers in the data).

The calculated F value is compared with a critical F value for the same degrees of freedom as:

$$dof_1 = x_{higher} - x_{lower};$$

$$dof_2 = N - x_{higher};$$

The statistic $F_{calc}$ follows an F-distribution (Fisher—Snedecor distribution), and the critical F value $F_{cr}$ for a significance level of 0.003 can be computed by:

$$F_{cr} = F(dof_1, dof_2, \text{significance level})$$

using well known statistical methods of calculating the critical F value. A significance value of 0.003 is selected for the test, however the significance levels could be relaxed to 0.01, 0.05 or a larger value. If $F_{calc} > F_{cr}$, then the improvement in residual sum of squares is significant with respect to the higher order model, and the test is continued with a higher integer, $n^{th}$ order model. If $F_{calc} < F_{cr}$, improvement in residual is insignificant with the higher order model and the lower order model can be used to sufficiently model the dynamics of cable stress relaxation. At this stage, the lower order model i.e. (n−1)th order model is maintained & selected for implementation and the step is stopped.

In an alternative embodiment, a secondary check (less restrictive/optional) for model adequacy for FIF application may be applied. The errors between the model force value and the actual force value at the end of the curing process are computed for all simulated imprint shots as:

$$e_{i,j,Cureend} = f_{i,j,Cureend} - f_{model,i,j,Cureend}.$$

The errors between the model force value and the actual force value for wafer averages, that is, the average over all imprints on a wafer is computed as:

$$e_{i,Cureend} = \frac{1}{p} \sum_{j=1}^{p} (f_{i,j,Cureend} - f_{model,i,j,Cureend})$$

The mean(s) |m|(S) is a statistical operator that calculates a mean of a set of values in the argument (S). The standard deviation σ(S) is a statistical operator that calculates a standard deviation of a set of values in the argument (S). The means (|m|) and standard deviation (σ) of the error distribution $e_{i,Cureend}$ are computed and are compared to the force variation specifications of the process for all the shots.

$$(|m|(e_{i,j,Cureend}) + 3\sigma(e_{i,j,Cureend})) <$$

$$\frac{1}{8} * 3\sigma \text{ of all imprints force specification}$$

In an embodiment, 3σ is a limit on the variation in force that is specified for all imprint shots in order to produce articles with the imprint process that have acceptable errors. Alternatively, or additionally, if only the force specification for wafer average is provided, the error between the wafer average force predicted by the model wafer force and the actual wafer average force is also computed and compared against the average wafer force variation specification of the process. If the following condition is met $$|m|(e_{i,Cureend}) + 3\sigma(e_{i,Cureend}) <$$

$$\frac{1}{2} * 3\sigma \text{ of wafer average force specification,}$$

then the corresponding model can be used for predicting the cable stress relaxation reliably to achieve the FIF specification of the process.

Once the condition is met, another robustness check for the model would be to check whether the model performs well over time before the end of curing processing such as (a) cure end minus 0.5 second spread time and (b) cure end minus 0.25 second spread time duration. This ensures that if the spread time is changed for some process, the same model can be used without significant model errors. Ideally, the model error distribution at these times should not be significantly wider than the error distribution at the end of curing process. The following criteria ensures that the model error distribution at a certain time δ (for example, 0.5 seconds) before cure end is not very different (less than 10% off) from the error distribution at end of curing:

$$\left| \frac{(|m|(e_{i,j,Cureend-\delta}) + 3\sigma(e_{i,j,Cureend-\delta})) - (|m|(e_{i,j,Cureend}) + 3\sigma(e_{i,j,Cureend}))}{(|m|(e_{i,j,Cureend}) + 3\sigma(e_{i,j,Cureend}))} \right| < 0.1$$

The suitable model order selection provides robustness to minor fluctuations and noise in non-contact data, that is, model parameters do not change significant with small behavior changes or slightly different noise. In addition, less computational and time complexity during identification and during real-time execution of the model can be expected. Additionally, the same model can be used for different processes using slightly smaller spread durations.

Figure 7:
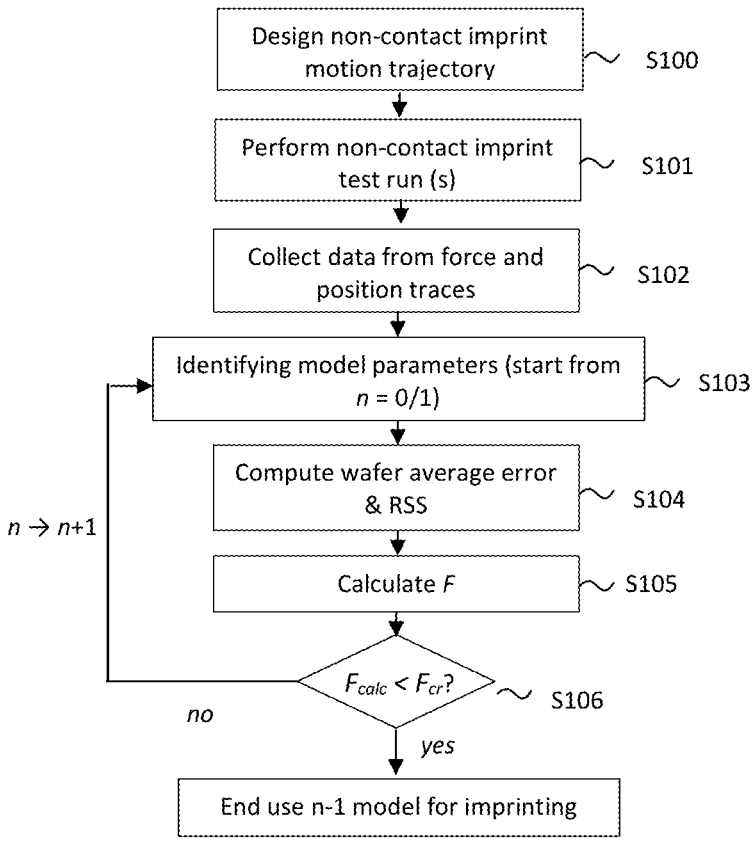
FIG. 7 shows the method of identifying a model for predicting force disturbances during curing process. The method models the cable stress relaxation dynamics.

FIG. 7 shows a method of predicting force disturbances during curing process. The method models the cable stress relaxation dynamics, such that cable relaxation can be predicted and compensated in real time. To provide sufficiently accurate predictions of a non-contact force disturbance to the FIF by (1) determining a suitable model order based on the imprint head non-contact position and force data that can sufficiently model the dynamics of cable disturbance based on the desired FIF specification and criteria; and (2) use a minimal order realization of the model, that is, minimal set of parameters to avoid overfitting issues and identifying dependent parameters through regression.

The method may also include a step S100 of designing the non-contact imprint motion of the imprint head IH as described above. FIG. 6 is an example of such a non-contact imprint test. The method starts with performing a non-contact imprint test in step S101 which was designed in step S100. The non-contact imprint test is close to an actual imprint run and includes four motion sequences for each wafer as shown in FIG. 6. In step S102, data are collected from the force traces and the position traces of the imprint head IH during the non-contact imprint test run. Based on the data collected in step S102, identification of the parameters for the model of stress relaxation dynamics starts with n=0/1 in step S103. Cable relaxation forces $f_t$ can be obtained by removing well-defined static and dynamic component of imprint head dynamics from the force traces. The wafer average error and residual sum of square RSS are computed in step S104. The F-value of the model is then calculated in Step S105 as $F_{calc}$ and then compared with a critical F value ($F_{cr}$) for the same degrees of freedom in step S106. If the $F_{calc}$>$F_{cr}$, then steps S103 to S106 are repeated for the next order (n=n+1). If $F_{calc}$<$F_{cr}$, the previous model order (n−1) is used to model the cable relaxation dynamics during imprinting. Subsequently, the selected model (n−1) is used for predicting cable force disturbance during an actual imprinting run & adjusting the force set-points (FIF set-points) in force control to account for these disturbances.

The method for identifying a model predicting force disturbances during curing process may be applied to manufacture an article. To form the article, a formable material is applied to a substrate, and the imprint head holding a template on which a pattern to be transferred to the formable material is brought in contact with the formable material. Once the pattern is transferred, a curing process is performed. The force disturbance during the curing process may be predicted by the model described with reference to the method as shown in FIG. 7. This disturbance estimate is then used to adjust the FIF setpoint (during the force control) so as to minimize the disturbance of the cables stress relaxation on the force exerted by the template against the resist during curing i.e. apply a precise FIF on every imprint field.

EXAMPLE 1

As discussed above, the FIF requirements, that is, the variation of wafer average FIF over a multi-wafer run, in an embodiment, should be less than 0.1 N as:

$$3\sigma(\text{Wafer average FIF}) \le 0.1 \text{ N}$$

Assuming that the ideal distribution of FIF over a multi-wafer run is a Gaussian distribution, the above statement implies that the wafer average FIF would be within ±0.05 N of the desired set-point with 99.7% probability. In this embodiment, a non-contact imprint test close to the actual imprint run for a $3\sigma$ process is designed and run in position control mode of the imprint head IH. A 10/25 wafer long imprint process with 58 fields on each wafer and a nominal $3\sigma$ is emulated, and force and position traces from the test are collected as shown in FIG. 8. Cable stress relaxation forces $f_t$ are obtained by removing the well-defined static and dynamic component of imprint head dynamics from the force traces as shown in FIG. 9. In step S103, model identification starts with n=1 and we fit the following state space model to the data:

$$\dot{x}(t)=Ax(t)+Bu(t)$$

$$f_t(t)=Cx(t)+Du(t),$$

where A=−$p_1$, B=$p_1$, C=$k_1$, D=$k_0$. The parameters can be found using a non-linear optimizer (such as FMINCON—a constrained non-linear optimization solver) as:

A=−1/533.737;
B=1/533.737;
C=−433.659; and
D=67348.298
RSS_wafer avg=0.08325.
|m|($e_{i,Cure\_end}$)+$3\sigma$($e_{i,Cure\_end}$)=0.06137+ 0.02025=0.08163

Steps S103 to S105 are repeated with n=2, and the parameters for n=2 can be obtained as:

$$A = \begin{bmatrix} -\dfrac{1}{587.739} & 0 \\ 0 & -\dfrac{1}{2.0047} \end{bmatrix}; B = \begin{bmatrix} \dfrac{1}{587.739} \\ \dfrac{1}{2.0047} \end{bmatrix};$$

$$C = [-411.120 - 1436.499]; D = 68415.673;$$

$$RSS\_wafer\_avg = 0.00304,$$

with
With number of wafers N=22, $$F_{calc} = \frac{\dfrac{RSS_{lower} - RSS_{higher}}{x_{higher} - x_{lower}}}{\dfrac{RSS_{higher}}{N - x_{higher}}} = \frac{\dfrac{0.08325 - 0.00304}{5 - 3}}{\dfrac{0.00304}{22 - 5}} = 225.8966$$

$$F_{cr} = F(2, 17, 0.003) = 8.33558$$

$$F_{calc} > F_{cr},$$

so that the improvement in wafer average residual is significant on increasing model order from n=1 to n=2. The same process, that is steps S103 to S106, are repeated with n=3. For n=3, $$RSS\_wafer\_avg = 0.001035, N = 22,$$

$$F_{calc} = \frac{\dfrac{RSS_{lower} - RSS_{higher}}{x_{higher} - x_{lower}}}{\dfrac{RSS_{higher}}{N - x_{higher}}} = \frac{\dfrac{0.00304 - 0.001035}{7 - 5}}{\dfrac{0.001035}{22 - 7}} = 14.5301;$$

$$F_{cr} = F(2, 15, 0.003) = 8.77216$$

$$F_{calc} > F_{cr},$$

so that the improvement in wafer average residual is significant on increasing the model order from n=2 to n=3. Therefore, steps S103 to S106 are repeated with n=4. With n=4, RSS_wafer_avg=0.001099, and number of wafers n=22.

$$F_{calc} = \frac{\dfrac{RSS_{lower} - RSS_{higher}}{x_{higher} - x_{lower}}}{\dfrac{RSS_{higher}}{N - x_{higher}}} = \frac{\dfrac{0.001035 - 0.001099}{9 - 7}}{\dfrac{0.001099}{22 - 9}} = -0.3771;$$

$$F_{cr} = F(2, 13, 0.003) = 9.3872$$

With n=4, $F_{calc}$<$F_{cr}$. The improvement in wafer average residual is not significant when increasing the model order from n=3 to n=4. Therefore, a third ($3^{rd}$) order model is used to model the cable stress relaxation dynamics and is selected for predicting cable stress relaxation disturbance forces during imprinting of device substrates. Additional model adequacy can also be checked for FIF application as shown below & the model is found to sufficiently model the wafer average force disturbances within the force precision requirements of 0.1 N.

$$|m|(e_{i,Cure\_end}) + 3s(e_{i,Cure\_end}) =$$

$$|-0.00304| + 0.01959 = 0.02263 < \frac{1}{2} * 0.1N$$

EXAMPLE 2

Similar to Example 1, the FIF requirements, that is, the variation of wafer average FIF over a multi-wafer run should be less than 0.1 N as:

$$3\sigma(\text{Wafer average FIF}) \leq 0.1 \text{ N}$$

Assuming the ideal distribution of FIF over a multi-wafer run would be a Gaussian distribution, the above statement implies that the wafer average FIF would be within $\pm 0.05N$ of the desired set-point with 99.7% probability. A non-contact imprint test with close to the actual imprint run for a 1.1s process is designed and run in a position control mode of the imprint head IH on one of the NIL tools as described in step S101. Data are collected from a non-contact imprint test run with 45 wafers as shown in FIG. 10. Cable and position traces as shown in FIG. 10 are used for model identification. By removing the well-defined static and dynamic component of imprint head dynamic force traces, the cable stress relaxation forces $f_r$ can be obtained as shown in FIG. 11. Starting with n=1 and fit the following state space model to the data:

$$\dot{x}(t) = Ax(t) + Bu(t)$$

$$f_r = Cx(t) + Du(t)$$

The residual sum of squares and F-test details for n=1, n=2, and n=3 for a run with 45 wafers (N=45) are listed in the following table:

| | X (# of indep. Params including $k_0$) | RSS | Adj. SS | RSS/N − $x_{\_higher}$ | $F_{calc}$ | $F_{cr}$ |
|---|---|---|---|---|---|---|
| n = 1 | 3 | 0.01796 | — | — | — | — |
| n = 2 | 5 | 0.00776 | 0.00510 | 0.00019 | 26.27746 | 6.74077 |
| n = 3 | 7 | 0.01016 | 0.00000 | 0.00027 | 0.00469 | 6.79507 |

As shown in the Table, when the model order is increased from n=2 to n=3, $F_{calc} < F_{cr}$. The improvement in wafer average residual is not significant. Thus, a $2^{nd}$ order model may be used to model the cable stress relaxation dynamics on this imprint head.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. A method for identifying a model for modeling cable stress relaxation dynamics of an imprint head, comprising:
performing a non-contact imprint test run for a predetermined number of wafers;
collecting data from a force trace and a position trace of the imprint head during the non-contact imprint test run;
computing cable stress relaxation forces based on the collected data;
generating a model having a plurality of different model orders;
identifying a plurality of sets of parameters of the model for the plurality of different model orders, wherein each of the different model orders has a respective set of parameters of the plurality of sets of parameters;
computing residual sum of squares for wafer average error for each of the different model orders based on the computed cable stress relaxation forces; and
selecting the respective set of parameters of one of the plurality of different model orders based on a difference in the residual sum of squares for the wafer average error between the one of the plurality of different model orders and a next higher model order,
wherein the non-contact imprint test run includes a first motion sequence of the imprint head which is idling at an up-plane with respect to an imprint plane before starting the imprint test run,
wherein the non-contact imprint test run includes a second motion sequence of the imprint head before starting imprint on a first wafer of the predetermined number of wafers, the second motion sequence includes a calibration measurement routine and a template mapping routine during which the imprint head moves to different planes,
wherein the model is generated with a state-space representation as:

$$\dot{x}(t) = Ax(t) + Bu(t)$$

$$f_r = Cx(t) + Du(t)$$

with the sets of parameters A, B, C, and D as:

$$A = \begin{bmatrix} 0 & 1 & 0 & \cdots & 0 \\ \vdots & \vdots & \ddots & \ddots & 0 \\ -a_n & -a_{n-1} & \cdots & \cdots & -a_1 \end{bmatrix};$$

$$B = \begin{bmatrix} 0 \\ \vdots \\ 1 \end{bmatrix}; C = [b_n \quad \cdots \quad \cdots \quad b_0]; D = k_0$$

where x(t) are state variables at time t, u(t) are positions of the imprint head at time t, $k_0$, $a_n$, $a_{n-1}$, ... $a_1$ and $b_n$, $b_{n-1}$, ... , $b_1$ are scalar parameters to be determined by fitting; $f_r$ is force disturbance due to cable stress relaxation, A is a n×n matrix, B is a n×1 matrix, C is a 1×n matrix, and n is an integer, and wherein the wafer average error is calculated as:

$$e_{i,Cureend} = \frac{1}{p}\sum_{j=1}^{p}(f_{i,j,Cureend} - f_{model,i,j,Cureend}),$$

where $e_{i.Cureend}$ is the wafer average error, $f_{i,j,cureend}$ is an actual force disturbance due to the cable stress relaxation at an end of a curing process, $f_{model.i.j.cureend}$ is a model force disturbance due to the cable stress relaxation at the end of the curing process, j is a particular imprint field, and p is a number of imprint fields.

2. The method according to claim 1, further comprising performing a third motion sequence on the first wafer of the predetermined number of wafers, the third motion sequence including an imprint motion sequence and a metrology sequence.

3. The method according to claim 2, further comprising performing a fourth motion sequence of the imprint head after the third motion sequence before starting imprint on a second wafer of the predetermined number of wafers, the imprint head idling at the up-plane and then moves along a calibration measurement routine during the fourth motion sequence.

4. The method according to claim 3, wherein times spent during each of the first motion sequence to fourth motion sequence are tunable.

5. The method according to claim 1, wherein the residual sum of square for the wafer average error is calculated as:

$$RSS = \sum_{i=1}^{q} e_{i,Cureend}^2$$

wherein RSS is the residual sum of squares, i is a particular wafer, q is a number of wafers.

6. A method of manufacturing an article, comprising:

applying a formable material on a substrate;

moving a template held in an imprint head to contact with the formable material to perform imprint on the formable material, wherein final imprint force applied to imprint the formable material is calibrated by a cable stress relaxation force which is estimated by identifying a first model for modeling cable stress relaxation dynamics of an imprint head, comprising:

performing a non-contact imprint test run for a predetermined number of wafers;

collecting data from a force trace and a position trace of the imprint head during the non-contact imprint test run;

computing cable stress relaxation forces based on the collected data;

generating a second model having a plurality of different model orders;

identifying a plurality of sets of parameters of the second model for the plurality of different model orders, wherein each of the model orders has a respective set of parameters of the plurality of sets of parameters;

computing residual sum of squares for wafer average error for each of the different model orders based on the computed cable stress relaxation forces; and selecting the respective set of parameters of one of the plurality of different model orders based on a difference in the residual sum of squares for the wafer average error between the one of the plurality of different model orders and a next higher model order, wherein the non-contact imprint test run includes a first motion sequence of the imprint head which is idling at an up-plane with respect to an imprint plane before starting the imprint test run, wherein the non-contact imprint test run includes a second motion sequence of the imprint head before starting imprint on a first wafer of the predetermined number of wafers, the second motion sequence includes a calibration measurement routine and a template mapping routine during which the imprint head moves to different planes, wherein the second model is generated with a state-space representation as:

$$\dot{x}(t)=Ax(t)+Bu(t)$$

$$f_r=Cx(t)+Du(t)$$

with the sets of parameters A, B, C, and D as:

$$A = \begin{bmatrix} 0 & 1 & 0 & \dots & 0 \\ \vdots & \vdots & \ddots & \ddots & 0 \\ -a_n & -a_{n-1} & \dots & \dots & -a_1 \end{bmatrix};$$

$$B = \begin{bmatrix} 0 \\ \vdots \\ 1 \end{bmatrix}; C = [\, b_n \quad \dots \quad \dots \quad b_0 \,]; D = k_0$$

where x(t) are state variables at time t, u(t) are positions of the imprint head at time t, $k_0$, $a_n$, $a_{n-1}$, ... $a_1$ and $b_n$, $b_{n-1}$, ..., $b_1$ are scalar parameters to be determined by fitting; $f_r$ is force disturbance due to cable stress relaxation, A is a n×n matrix, B is a n×1 matrix, C is a 1×n matrix, and n is an integer, and wherein the wafer average error is calculated as:

$$e_{i,Cureend} = \frac{1}{p}\sum_{j=1}^{p}(f_{i,j,Cureend} - f_{model,i,j,Cureend}),$$

where $e_{i,Cureend}$ is the wafer average error, $f_{i,j,cureend}$ is an actual force disturbance due to the cable stress relaxation at an end of a curing process, $f_{model.i.j.cureend}$ is a model force disturbance due to the cable stress relaxation at the end of the curing process, j is a particular imprint field, and p is a number of imprint fields.

* * * * *